June 24, 1930. J. M. CALLOW 1,766,166
FILTERING APPARATUS
Filed March 31, 1926
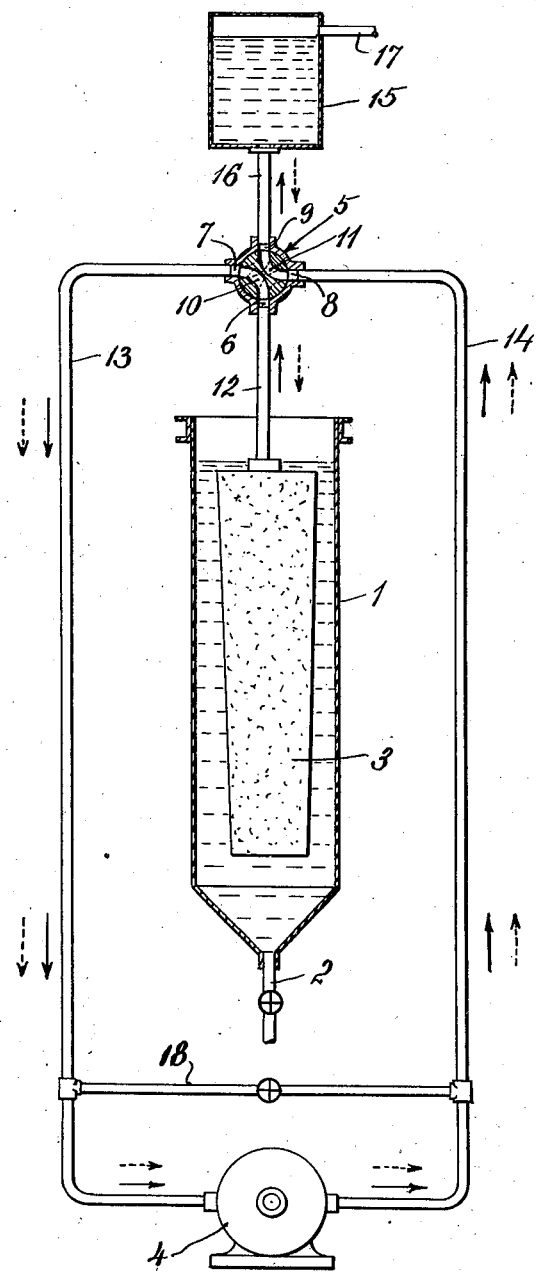
INVENTOR
John M. Callow
BY
Pennie, Davis, Marvin & Edmonds
ATTORNEYS Patented June 24, 1930

1,766,166

UNITED STATES PATENT OFFICE

JOHN M. CALLOW, OF NEW YORK, N. Y., ASSIGNOR TO GENTER THICKENER COMPANY, OF SALT LAKE CITY, A CORPORATION OF DELAWARE

FILTERING APPARATUS

Application filed March 31, 1926. Serial No. 98,693.

This invention relates to filtering apparatus and has for its object the provision of certain improvements in such apparatus.

The invention relates particularly to filtering apparatus having a filter medium immersed in the mixture to be filtered, and in which the filter medium is periodically cleansed by a reversed current flow therethrough. In filtering apparatus of this character, an appropriate fluid pressure means, such as a centrifugal or other suitable type of pump, is operatively connected to the filtrate side of the filter medium, and the reversed current for cleansing is effected by reversing the fluid pressure means, as, for example, reversing the direction of operation of the pump. In practice, it is frequently desirable or even necessary for satisfactory operation to cleanse the filter medium by reversing the current therethrough every few minutes, and this not only imposes a severe duty on the pump, or other fluid pressure means, but results in a loss of time.

My present invention contemplates an improved arrangement of the operating elements in such a filtering apparatus whereby the fluid pressure means, such as a pump, produces both the filtering action and the counter-current cleansing action while itself operating continuously in one direction only. Thus, in a filtering apparatus in which a pump is operatively connected to the filtrate side of the filter medium for effecting both the filtering action and the counter-current cleansing action, the present invention involves the provision of appropriate control instrumentalities, such as a rotary valve, for intermittently and successively causing the pump to exert a filtering action and a counter-current cleansing action upon the filter medium while the pump operates continuously without reversing, so that the current flow therethrough continues always in one direction. In other words, the filtering element is alternately subjected to suction and pressure, while the pump operates continuously in the same direction.

The invention is particularly adapted to be embodied in a filtering apparatus in which the mixture to be filtered and the filtrate are continuously in contact with opposite sides of the filter medium and the cleansing action is brought about by filtrate blow-back, that is a reversed flow of filtrate through the filter medium. In filtering apparatus of this type, a sufficient storage of filtrate is provided to maintain the reversed flow of filtrate through the filter medium for such interval of time as is required to effectively cleanse the medium. This may be done by constructing the piping system between the filter medium, usually a plurality of filter elements, with sufficient filtrate storage capacity for the requirements of effective filtrate cleansing action. I prefer, however, in the practice of the present invention, to provide a substantial filtrate storage reservoir and to operatively connect the pump, or other suitable fluid pressure means, between the filter elements and the filtrate storage reservoir. Then, in accordance with the invention, appropriate control instrumentalities, such as a rotary valve, are provided for periodically causing the pump to reverse the direction of flow of filtrate between the filter elements and the filtrate storage reservoir without reversing the direction of flow of the filtrate through the pump itself.

It will be understood by those skilled in the art that filtering apparatus of the character to which the present invention relates may and usually will comprise a plurality of filtering elements suspended or otherwise appropriately immersed in the mixture to be filtered. The pump, or other appropriate fluid pressure means, will then be operatively connected to all of the filter elements through a rotary valve, or other appropriate control means, so that it will cause one or more of these filtering elements to be subjected to the counter-current cleansing action, preferably filtrate flow-back, while causing the remainder of the filter elements to be simultaneously subjected to the filtering action. The control means, such as a rotary valve, is so constructed and operated that the filter elements are subjected in succession or sequence to the counter-current cleansing action. Thus, while the individual filter elements are intermittently and successively subjected to filtration and counter-current cleansing, the apparatus as a whole functions as a continuous filter.

The invention is susceptible of embodiment in various types and constructions of filtering apparatus. For the purposes of explanation I have, in the single figure of the accompanying drawing, illustrated the invention embodied in a suction filter of the filter-thickener type. The apparatus is only diagrammatically illustrated in the drawing, and in the interest of simplicity only a single filter element is shown and the other operating elements are diagrammatically indicated in their simplest forms.

The mixture to be filtered is held in an appropriate tank or receptacle 1, having a bottom outlet 2 for the discharge of thickened material. In practice, fresh mixture to be filtered is more or less continuously supplied to the receptacle 1, and the thickened product is more or less continuously withdrawn from the receptacle through the outlet 2.

A filter element 3 is appropriately suspended, or otherwise suitably mounted, within the receptacle 1. The filter element is covered with a suitable filter medium and is submerged in the mixture to be filtered. Under normal operating conditions the outer surface of the filter medium will be continuously in contact with the mixture to be filtered while the inner surface of the medium will be continuously in contact with the filtrate. The filter element may be hollow or otherwise appropriately constructed to receive the filtrate passing through the filter medium.

The interior of the filter element is operatively connected to a suction pump 4. In accordance with the principles of my invention the pump is connected to the filter element through a rotary valve 5. The rotary valve has two operating positions, in one of which the suction side of the pump 4 is in direct communication with the filter element 3 and in the other of which the discharge side of the pump is in direct communication with the filter element. Thus, the stationary member of the valve has four ports 6, 7, 8 and 9 and the rotary member has two separate passages 10 and 11. The port 6 is connected through a pipe 12 to the interior of the filter element. The port 7 is connected through a pipe 13 to the suction side of the pump, and the port 8 is connected through a pipe 14 to the discharge side of the pump.

The port 9 is connected to a filtrate storage receptacle 15 by means of a pipe 16. The receptacle 15 has an overflow or outlet 17, to permit the discharge of the filtrate after the storage in the receptacle of the desired amount of filtrate for cleansing the filter element by filtrate blow-back.

The operation of the apparatus is substantially as follows. The pump is operated continuously in the same direction. The valve 5 is operated by any appropriate mechanism, well understood in the art, to first maintain the passage 10 in registry with the ports 6 and 7, and the passage 11 in registry with the ports 8 and 9 (the full line position shown in the drawing) and to then maintain the passage 10 in registry with the ports 6 and 8 and the passage 11 in registry with the ports 7 and 9 (the dotted line position shown in the drawing).

With the valve 5 in its full line position, as shown in the drawing, the suction side of the pump is directly connected to the interior of the filter element and the filtering action proceeds. The pump draws the filtrate through the filter medium and forces it into the receptacle 15. The direction of flow of filtrate through the system during the filtering period is shown by the full line arrows on the drawing. The filtering action may continue for any suitable predetermined period of time, in practice from about 30 seconds up to 10 minutes or more. The valve 5 is then moved to its dotted line position, as shown in the drawing, and the suction side of the pump is now directly connected to the filtrate storage reservoir 15 and the discharge side of the pump is directly connected to the interior of the filter element. The pump now draws filtrate from the reservoir 15 and forces it into the filtering element to produce the filtrate counter-current cleansing action. The direction of flow of filtrate through the system during the cleansing period is shown by the dotted arrows on the drawing. The cleansing action may continue for any suitable predetermined period of time, varying in practice from a few seconds to a few minutes.

The valve 5 is automatically operated to effect periods of filtration of predetermined duration alternating with cleansing periods of predetermined duration. The period of filtration followed by the cleansing period represents a complete cycle of operation with respect to an individual filter element. With a rotary valve of the type illustrated in the accompanying drawing, one complete revolution of the rotary member of the valve effects two complete cycles of filtration and cleansing.

The pump 4 is never reversed, but continues to run in one direction. While continuing thus to run in one direction it is nevertheless able, through the cooperation of the rotary valve, to intermittently and successively exert a filtering action and a counter-current cleansing action upon the filter medium. In other words, the continuously operating pump itself produces the intermittent filtering actions alternating with counter-current cleansing actions, and the cycle of filtering and cleansing actions follow successively.

Where the capacity of the pump is greater than the requirements of filtering and cleansing, a valved by-pass 18 may be provided between the suction and discharge sides of the pump. By appropriate adjustment of this by-pass, a definite amount of filtrate may be caused to recirculate therethrough, thus keeping the pump fully charged or primed with filtrate.

Both the filtering action and the counter-current cleansing action are produced by the pump, while the direction of flow of fluid through the pump remains always in one direction. The same pump may, of course, be connected to any desired number of filter elements. The control valve may be constructed to cause the pump to subject all of the filtering elements simultaneously to periods of filtration alternating with periods of simultaneous cleansing of all the filter elements. Where the filtering elements are divided into groups of one or more, and these groups are subjected to the cleansing action successively while the remaining groups of filter elements are filtering, the valve construction will be appropriately modified to effect this result.

The invention is particularly adapted to be embodied in reduced pressure or suction filters, especially of the filter-thickener type, for use in the sugar industry in filtering and thickening hot sugar juices or liquors. In such apparatus, the complete cycle may vary in practice from about 32 seconds to several minutes. Thus, the periods of filtration may be from 30 seconds up to 8 minutes and the periods of cleansing from 2 seconds up to one or two minutes. In other industries, the operating cycle will be determined by the nature of the mixture to be filtered, its temperature and other conditions influencing the filtering and cleansing actions. The periods of filtration will be substantially longer than the periods of cleansing, which latter will ordinarily be of only such duration as is needed to maintain effective filtration, through the filter medium.

I claim:—

1. The combination in a filtering apparatus in which the mixture to be filtered and the filtrate are continuously in contact with opposite sides of a filter medium, of a pump operatively connected to the filtrate side of said medium, and means associated with the pump whereby said pump operates alternately to subject said filter medium to suction and pressure adapted to provide a filtering current and a filtrate counter-current while the current flow through the pump continues in the same direction.

2. The combination in a filtering apparatus having a filter medium immersed in the mixture to be filtered, of a pump operatively connected to the filtrate side of said medium and adapted to subject the medium to a filtering action and a counter-current cleansing action, and means cooperating with said pump for alternately subjecting said filter medium to suction and pressure to exert a filtering action and a counter-current cleansing action upon said filter medium while the pump operates continuously to produce a current flow therethrough in one direction only.

3. The combination in a filtering apparatus having a filter medium immersed in the mixture to be filtered, of fluid pressure means operatively connected to the filtrate side of said medium and adapted to subject the medium to a filtering action and a counter-current cleansing action, and controlling instrumentalities for alternately subjecting said filter medium to suction and pressure adapted to exert a filtering action and a counter-current cleansing action upon said filter medium while the direction of flow of fluid through said fluid pressure means continues always in the same direction.

4. The combination in a filtering apparatus in which the mixture to be filtered and the filtrate are continuously in contact with opposite sides of a filter medium, of fluid pressure means operatively connected to the filtrate side of said means and arranged to subject the medium to a filtering current and a filtrate counter-current, and controlling instrumentalities for alternately subjecting said filter medium to suction and pressure adapted to exert a filtering action and a counter-current cleansing action upon said filter medium while the direction of flow of fluid through said fluid pressure means continues always in the same direction.

5. The combination in a filtering apparatus in which the mixture to be filtered and the filtrate are continuously in contact with opposite sides of a filter medium, of a pump operatively connected to the filtrate side of said medium and arranged to subject the medium to a filtering current and a filtrate counter-current, and means cooperating with said pump for alternately subjecting said filter medium to suction and pressure adapted to exert a filtering action and a filtrate counter-current action upon said filtering medium while the pump operates continuously to produce a current flow therethrough in one direction only.

6. The combination in a filtering apparatus in which the mixture to be filtered and the filtrate are continuously in contact with opposite sides of a filter medium, of a filtrate storage, fluid pressure means operatively connected between the filtrate side of said filter medium and said filtrate storage and arranged to subject the filter medium to a filtering current and a filtrate counter-current, and controlling instrumentalities for alternately subjecting said filter medium to suction and pressure adapted to exert a filtering action and a filtrate counter-current action upon said filtering medium while the direction of flow of filtrate through said fluid pressure means continues always in the same direction.

7. The combination in a filtering apparatus in which the mixture to be filtered and the filtrate are continuously in contact with opposite sides of a filter medium, of a filtrate storage, a pump operatively connected between the filtrate side of said filter medium and said filtrate storage and adapted to subject the filter medium to a filtering current and a filtrate counter-current, and means cooperating with said pump for alternately subjecting said filter medium to suction and pressure adapted to exert a filtering action and a filtrate counter-current action upon said filtering medium while the pump operates continuously to produce a current of filtrate therethrough in one direction only.

8. The combination in a filtering apparatus having a filter medium immersed in the mixture to be filtered, of a pump operatively connected to the filtrate side of said medium, and a control valve cooperating with said pump for alternately subjecting said filter medium to suction and pressure adapted to exert a filtering action and a counter-current cleansing action upon said filter medium while the pump operates continuously to produce a current flow therethrough in one direction only.

9. The combination in a filtering apparatus in which the mixture to be filtered and the filtrate are continuously in contact with opposite sides of a filter medium, of a pump operatively connected to the filtrate side of said medium, and a control valve cooperating with said pump for alternately subjecting said filter medium to suction and pressure adapted to exert a filtering action and a filtrate counter-current cleansing action upon said filter medium while the current flow through the pump continues in one direction only.

10. The combination in a filtering apparatus in which the mixture to be filtered and the filtrate are continuously in contact with opposite sides of a filter medium, of a filtrate storage, a pump operatively connected between the filtrate side of said filter medium and said filtrate storage, and a control valve cooperating with said pump for alternately subjecting said filter medium to suction and pressure adapted to exert a filtering action and a filtrate counter-current cleansing action upon said filter medium while the flow of filtrate through the pump continues always in one direction only.

11. A filtering apparatus for permanently separating solids from liquids, in which the mixture to be filtered and the filtrate are continuously in contact with opposite sides of a filter medium, comprising a pump operatively connected to the filtrate side of the filter medium, and means cooperating with said pump and filter medium for alternately exerting a suction filtering action and a pressure filtrate counter-current action upon the medium whereby accumulated solids are forced from the medium, said pump operating continuously to produce a filtrate current flow therethrough in one direction only.

12. A filtering apparatus for permanently separating solids from liquids, in which the mixture to be filtered and the filtrate are continuously in contact with opposite sides of a filter medium, comprising a filtrate storage, fluid pressure means operatively connected between the filtrate side of said filter medium and said filtrate storage, and controlling instrumentalities cooperating with said fluid pressure means and filter medium for alternately exerting a suction filtering action and a pressure filtrate counter-current action upon the medium whereby accumulated solids are forced from the medium, said fluid pressure means operating continuously to produce a filtrate current flow therethrough in one direction only.

In testimony whereof I affix my signature.

JOHN M. CALLOW.